United States Patent [19]
Morrison et al.

[11] Patent Number: 5,259,047
[45] Date of Patent: Nov. 2, 1993

[54] METHODS FOR DETERMINING OPTICAL FIBER JOINT LOSS AND JOINT ELEMENTS USEFUL IN THOSE METHODS

[75] Inventors: Shawn J. D. Morrison; Laurence R. Noon, both of Saskatoon, Canada

[73] Assignee: Northern Telecom Limited, Montreal, Canada

[21] Appl. No.: 41,379

[22] Filed: Apr. 1, 1993

[51] Int. Cl.$^5$ .............................. G02B 6/00; G02B 6/36
[52] U.S. Cl. ........................................ 385/27; 385/69; 385/95
[58] Field of Search .................. 385/27, 39, 53, 69, 385/70, 71, 73, 75, 95, 96, 97, 98, 99

[56] References Cited
U.S. PATENT DOCUMENTS

| | | | |
|---|---|---|---|
| 4,254,865 | 3/1981 | Pacey et al. | 206/316 |
| 4,562,632 | 1/1986 | Parchet et al. | 79/28.1 |
| 4,652,123 | 3/1987 | Neumann | 356/73.1 |
| 4,662,962 | 5/1987 | Malavieille | 156/158 |
| 4,730,892 | 3/1988 | Anderson | 385/70 |
| 4,850,671 | 7/1989 | Finzel | 385/69 |
| 5,029,972 | 7/1991 | Lukas et al. | 385/95 |
| 5,133,033 | 7/1992 | Lukas et al. | 385/65 |

*Primary Examiner*—Akm E. Ullah
*Attorney, Agent, or Firm*—C. W. Junkin

[57] ABSTRACT

Optical fiber joint loss is determined by launching an optical signal in an upstream fiber and measuring the launched signal at an end of the upstream fiber which is to be joined to a downstream fiber, joining the upstream fiber to the downstream fiber and disposing the joint in a transparent medium, the transparent medium having a refractive index substantially equal to or greater than a refractive index of a cladding of the downstream fiber, measuring a fixed proportion of optical power coupled at a predetermined angle with respect to a longitudinal axis of the downstream fiber immediately adjacent the joint, and estimating the optical fiber joint loss as $L=1-k(P_o/P_i)$, where L is the estimated joint loss, $P_i$ is the optical power measured before making the joint, $P_o$ is the optical power measured after making the joint, and k is an empirically determined proportionality constant. The joint may be disposed in the transparent medium by location in a suitable joint element having at least one coupling formation for coupling out of the element light propagating in the element at the predetermined angle. The method and associated joint elements are particularly suitable for measuring joint losses under 0.5 dB.

17 Claims, 3 Drawing Sheets

METHODS FOR DETERMINING OPTICAL FIBER JOINT LOSS AND JOINT ELEMENTS USEFUL IN THOSE METHODS

FIELD OF THE INVENTION

This invention relates to methods for determining the loss of optical fiber joints such as splices and connectors, and to joint elements useful in those methods.

BACKGROUND OF THE INVENTION

Technicians generally measure the loss of optical fiber splices on installation to ensure that the splice loss is low enough for proper system performance.

U.S. Pat. 4,652,123 discloses a known method for measuring optical fiber splice loss in the field. According to this method, first and second bent fiber couplers are attached to the spliced fibers at locations which are upstream of the splice and downstream of the splice respectively. A third bent fiber coupler is then attached to the downstream fiber between the second coupler and the splice. Optical signals propagating toward the splice are launched at the first and second couplers and detected at the third coupler as optical power measurements $P_{21}$ and $P_{12}$ respectively. The third coupler is then moved to a location between the first coupler and the splice, and the signals launched at the first and second couplers are detected by the third coupler as optical power measurements $P_{11}$ and $P_{12}$ respectively. The absolute splice loss L is then computed from the relationship: $L^2=(P_{21}P_{12})/(P_{11}P_{22})$, where L is the splice loss stated as a linear fraction of the signal passed by the splice. The splice loss in dB is given by 10 Log L. (U.S. Pat. No. 4,652,123 was issued in the name of Richard Neumann on Mar. 24, 1987 and is entitled "Method and Apparatus for Measuring Absolute Fiber Junction Loss".)

The method disclosed in U.S. Pat. No. 4,652,123 infers the splice loss from measurements of launched and transmitted power. This indirect determination of the splice loss can be very accurate if the actual splice loss is approximately 0.5 dB or greater. However, if the actual splice loss is significantly less than 0.5 dB, it is comparable to the normal measurement error for the measurement of $P_{11}$, $P_{12}$, $P_{21}$ and $P_{22}$. Consequently, for low loss splices the normal measurement error may obscure the splice loss, and the method of U.S. Pat. No. 4,652,123 may provide an inaccurate determination of the actual splice loss.

SUMMARY OF THE INVENTION

This invention provides novel methods and joint elements for the determination of optical fiber joint loss in the field. The novel methods and joint elements are particularly suitable for determination of small joint losses which are difficult to determine accurately using the method of U.S. Pat. No. 4,652,123.

One aspect of the invention provides a method for determining optical fiber joint loss. According to the method, an optical signal is launched in an upstream fiber $ and the launched signal is measured at an end of the upstream fiber which is to be joined to a downstream fiber. The upstream fiber is joined to the downstream fiber and the joint is disposed in a transparent medium, the transparent medium having a refractive index substantially equal to or greater than a refractive index of a cladding of the downstream fiber. A fixed proportion of optical power coupled at a predetermined angle with respect to a longitudinal axis of the downstream fiber immediately adjacent the joint is then measured, and the optical fiber joint loss is estimated as $L=1-k(P_o/P_i)$, where L is the estimated joint loss, $P_i$ is the optical power measured before making the joint, $P_o$ is the optical power measured after making the joint, and k is an empirically determined proportionality constant.

Because a portion of the optical power lost at the joint is measured directly instead of being inferred from the difference between two power measurements, this method can provide a more accurate estimate of joint loss if the joint loss is a smaller proportion of the launched and received power than the proportional error of the power measurement process.

The upstream fiber may be joined to the downstream fiber and the joint may be disposed in the transparent medium by inserting the upstream and downstream fibers in a joint element having an alignment formation for aligning the upstream and downstream fibers and a retaining arrangement for retaining the fibers in alignment, the element being at least partially transparent and having at least one coupling formation for coupling out of the element light propagating in the element at the predetermined angle.

Alternatively, the joint may be completed first and disposed in the transparent medium by enclosing the completed joint in a joint element, the element being at least partially transparent and having at least one coupling formation for coupling out of the element light propagating in the element at the predetermined angle.

The joint element may contain a refractive index matching material for coupling light from the cladding of the downstream fiber to the joint element.

Another aspect of the invention provides an optical fiber joint element. The joint element comprises a body having a passage therethrough for receiving optical fibers. The body is at least partially transparent, has a refractive index greater than 1.45, and has a coupling formation for coupling out of the body light propagating in the body at a particular angle relative to the passage.

The coupling formation may comprise an end face of the body which is oriented normal to a line extending at the predetermined angle. Alternatively, the coupling formation may comprise a facet on a lateral face of the body, the facet being oriented normal to the predetermined angle, or a diffraction grating on a lateral face of the body. The body may have multiple coupling formations arranged symmetrically about the passage.

The joint element may be a simple package for enclosing a completed joint, or may be a mechanical splice which aligns the joined fibers and holds them in alignment. Where the joint element is a mechanical splice, the body may comprise a first body part having a surface formation defining a v-groove, a second body part movable with respect to the first body part, a surface of the second body part together with the v-groove of the first body part defining the passage, and urging means for urging the second body part toward the first body part to align and retain optical fiber ends in the v-groove.

BRIEF DESCRIPTION OF THE DRAWINGS

Embodiments of the invention are described below by way of example only. Reference is made to accompanying drawings, in which.

DESCRIPTION OF EMBODIMENTS

Figure 1:
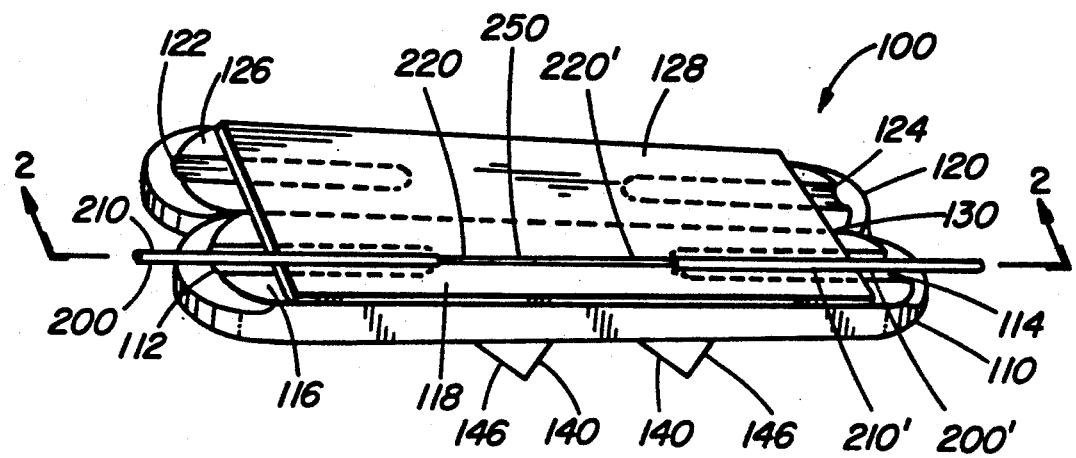
FIG. 1 is a pictorial view of a protective package according to a first embodiment, the protective package shown in an unfolded configuration.

FIG. 1 is a pictorial view of a joint element in the form of a splice package 100 for enclosing aligned and spliced optical fibers. The splice package 100 is generally of a design described in U.S. Pat. No. 4,254,865 issued Mar. 10, 1989 in the names of G. Pacey et al and entitled "Protective Package for an Optical Fiber Splice", which is hereby incorporated by reference.

The splice package 100 comprises a body in the form of a pair of elongate body parts 110, 120 which are joined at corresponding lateral edges by an integral hinge formation 130. Each of the body parts 110, 120 has a pair of axially aligned grooves 112, 114, 122, 124 sized to receive optical fibers 200, 200' surrounded by a protective coating 210, 210, Each groove 112, 114 of one body part 110 is opposite a corresponding groove 122, 124 of the other body part 120 so that the grooves 112, 122, 114, 124 come together to define axial passages when the body is folded at the integral hinge formation 130. The groove bearing surfaces 116, 126 of the body parts 110, 120 are coated with adhesive layers 118, 128.

The protective package 100 is used to protect a completed fusion splice 250. The fusion splice 250 is made by stripping a short section of protective coating 210, 210' from ends 220, 220, of each of two optical fibers 200, 200' to be spliced, axially aligning and abutting the stripped fiber ends 220, 220' and fusing the aligned fibers with an electric arc. The fused fibers 200, 200' are placed onto the adhesive layers 118, 128 with the protective coatings 210, 210, of the fibers 200, 200' over corresponding grooves 112, 114, and the package 100 is folded at the integral hinge 130 to enclose the splice 250. The fibers 200, 200' and surrounding protective coating 210, 210' are received in the axial passages, and the adhesive layers 118, 128 deform around the uncoated sections of fiber adjacent the splice to define a passage which, together with the axial passages, defines a passage through the package 100.

Figure 2:
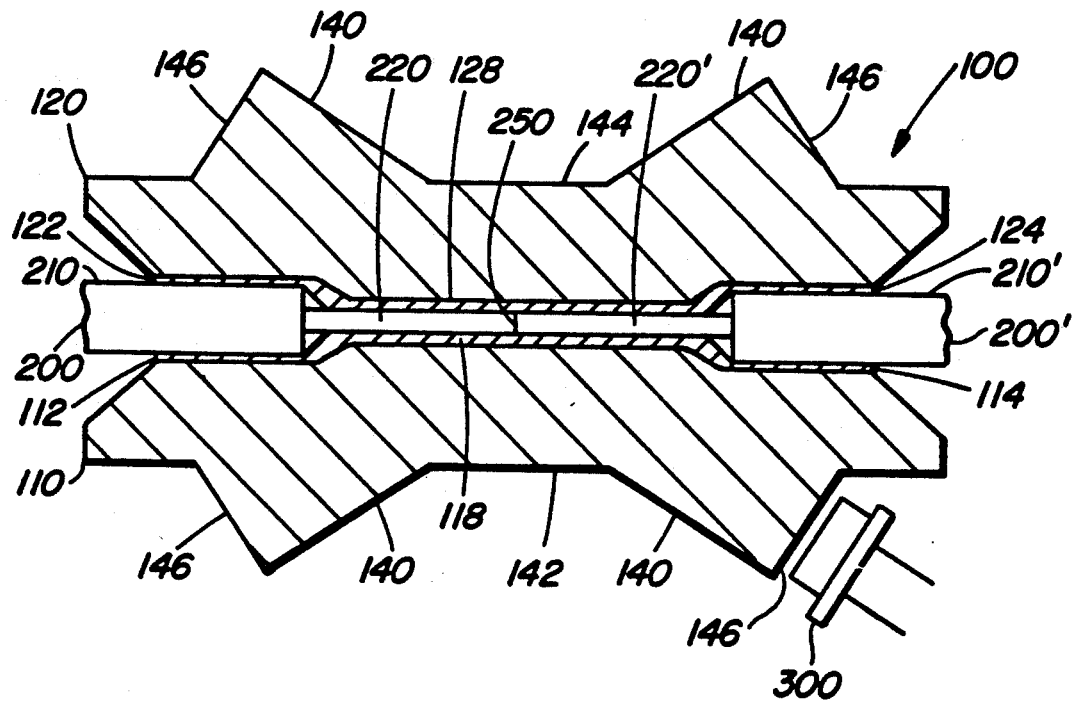
FIG. 2 a cross-sectional view of the protective package of FIG. 1 taken on section line 2—2 of FIG. 1, the protective package shown in a folded configuration.

Unlike the protective packages disclosed in U.S. Pat. No. 4,254,865, each body part 110, 120 of the protective package 100 is constructed from a transparent polycarbonate plastic which has a refractive index approximately equal to or greater than the refractive index of cladding layers of the optical fibers 200, 200', and the adhesive layers 118, 128 are also index matched to the cladding layers of the fibers 200, 200'. Each body part 110, 120 also has a pair of coupling formations 140 on surfaces 142, 144 opposite the groove bearing surfaces 116, 126 as shown in FIG. 2. The coupling formations 140 have facets 146 which are oriented normal to directions which define approximately 25 degree angles relative to an axial direction defined by the fiber containing passage. For most conventional single mode optical fibers used for telecommunications applications, optical power which is scattered at an angle approximately 25 degrees from the axis of the spliced fibers is coupled into cladding modes and contributes to splice loss. Because the adhesive layers 118, 128 and the body parts 110, 120 are index matched to the cladding of the optical fibers, some of the scattered optical power is coupled into the body parts 110, 120 and propagates to the coupling formations 140. An optical detector 300 can be located adjacent to one of the facets 146 to measure a proportion of the scattered optical power to obtain a measure of optical power lost at the splice 250.

The splice package 100 can be used in the accurate estimation of very small splice losses. Before a splice 250 is made to join an upstream fiber 200 to a downstream fiber 200', an optical signal is launched in the upstream fiber 200, and the launched signal is measured at a downstream end of the upstream fiber 200 which is to be joined to an upstream end of the downstream fiber 200'. The optical signal may be launched at an upstream end of the upstream fiber 200 using a conventional end coupling arrangement, or may be launched intermediate the ends of the upstream fiber 200 using a conventional bent fiber coupling arrangement. The upstream and downstream fibers 200, 200' are then spliced together, and the spliced fibers 200, 200' are enclosed in the protective package 100 as described above to dispose the splice 250 in a transparent medium comprising the adhesive layers 118, 128 and the body parts 110, 120, both of which have a refractive index substantially equal to the refractive index of the cladding of the downstream fiber 200'. An optical detector 300 is disposed adjacent to one of the facets 146 to measure a fixed proportion of optical power lost at the splice 250, and the splice loss is estimated as $L = 1 - k(P_o/P_i)$, where L is the estimated joint loss, $P_i$ is the optical power measured before making the joint, $P_o$ is the optical power measured after making the joint, and k is an empirically determined proportionality constant.

The proportionality constant k must be determined by a calibration procedure. In the calibration procedure, an optical signal is launched at an upstream end of a length of optical fiber and the resulting optical signal $P_1$ is measured at a downstream end of the optical fiber. The optical fiber is broken to provide upstream and downstream lengths 200, 200' of optical fiber, with the optical signal launched into the upstream end of the upstream fiber. The resulting optical signal $P_2$ is then measured at a downstream end 220 of the upstream fiber 200. The upstream and downstream lengths 200, 200' of optical fiber are then spliced together, and the resulting optical signal $P_3$ is measured at a downstream end of the downstream fiber. The splice loss is computed as $L = P_3/P_1$. The splice 250 is then enclosed in a protective package 100, an optical detector 300 is placed adjacent to one of the facets 146, and the fixed proportion $P_4$ of optical power coupled out of the facet 146 is measured. The proportionality constant is then calculated according to $k = (1 - L)(P_2/P_4)$.

Several such calibration measurements may be averaged to obtain a more reliable result. Recalibration is required for each change in fiber design or splice package design.

Light scattered by the splice 250 is more readily coupled into the body parts 110, 120 when the optical source operates at a wavelength of 1550 nm than when the optical source operates at 1300 nm. Consequently, more reliable measurements may be made at 1550 nm than at 1300 nm. The measurements of splice loss made at 1550 nm give a reasonably accurate estimate of the splice loss at 1300 nm even though they are made at a different wavelength.

Figure 3:
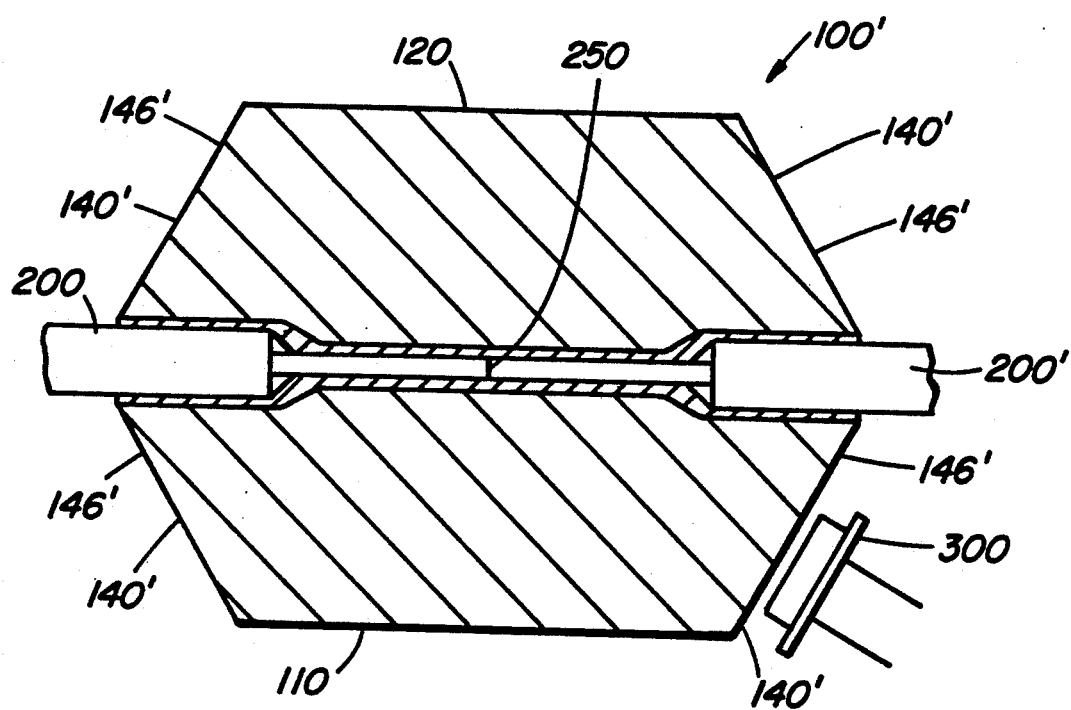
FIG. 3 is a cross-sectional view similar to FIG. 2 of a protective package according to a second and third embodiment.
Figure 4:
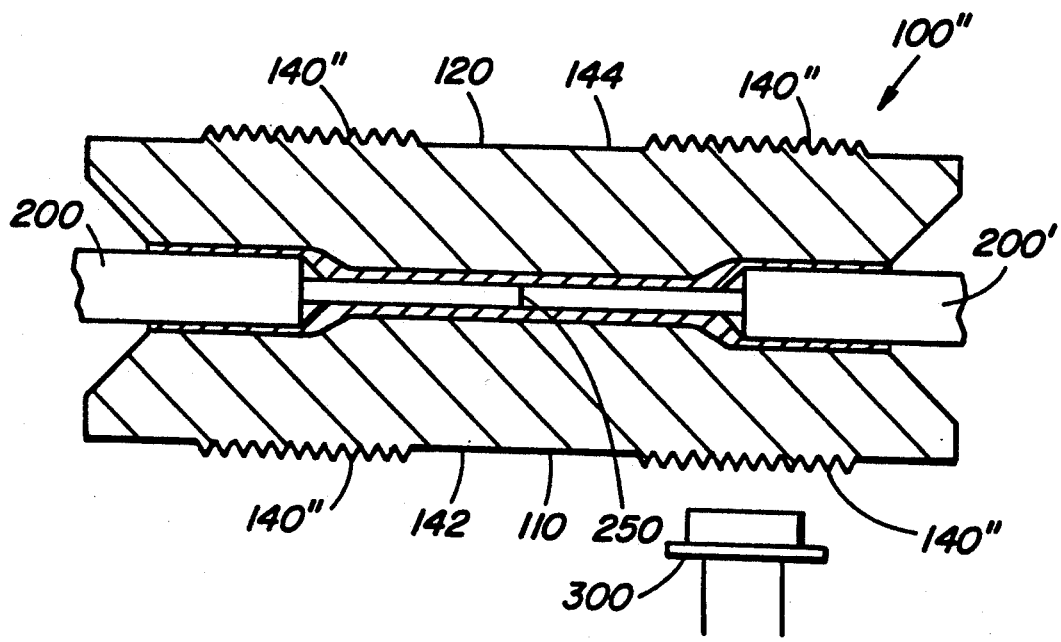
FIG. 4 is a pictorial view of a mechanical splice according to a fourth embodiment.

FIG. 3 shows another embodiment 100' of the protective splice package 100 having alternative coupling formations in the form of end faces 140' which are oriented normal to directions which define 25 degree angles relative to an axial direction defined by the fiber containing passage. FIG. 4 shows a further embodiment 100" of the protective splice package 100 having alternative coupling formations in the form of diffraction gratings 140" on the surfaces 142, 144 of the body parts 110, 112 which are opposite the groove bearing surfaces 116, 126. Both of these embodiments 100', 100" can be used in the same manner as the first embodiment 100 to estimate splice loss.

Figure 5:
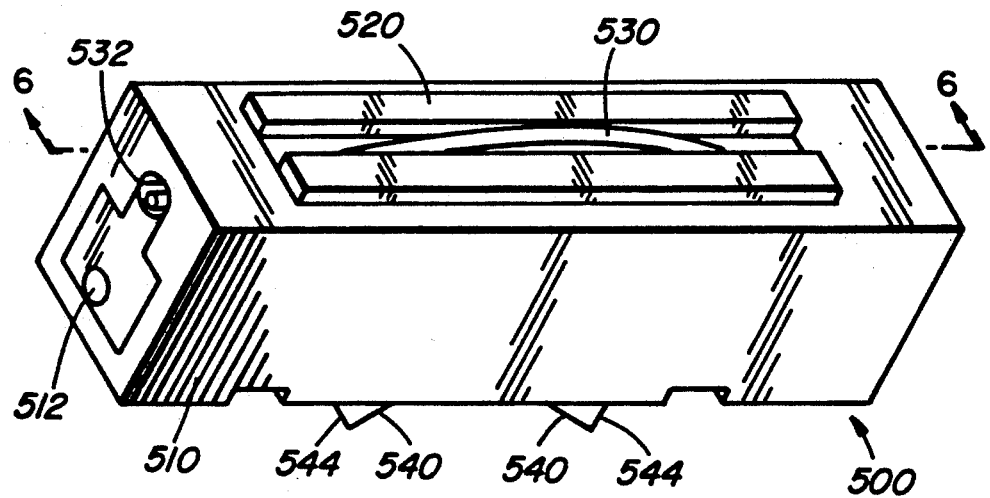
FIG. 5 is a cross-sectional view of the mechanical splice of FIG. 4 taken on section line 5—5 of FIG. 4.
Figure 6:
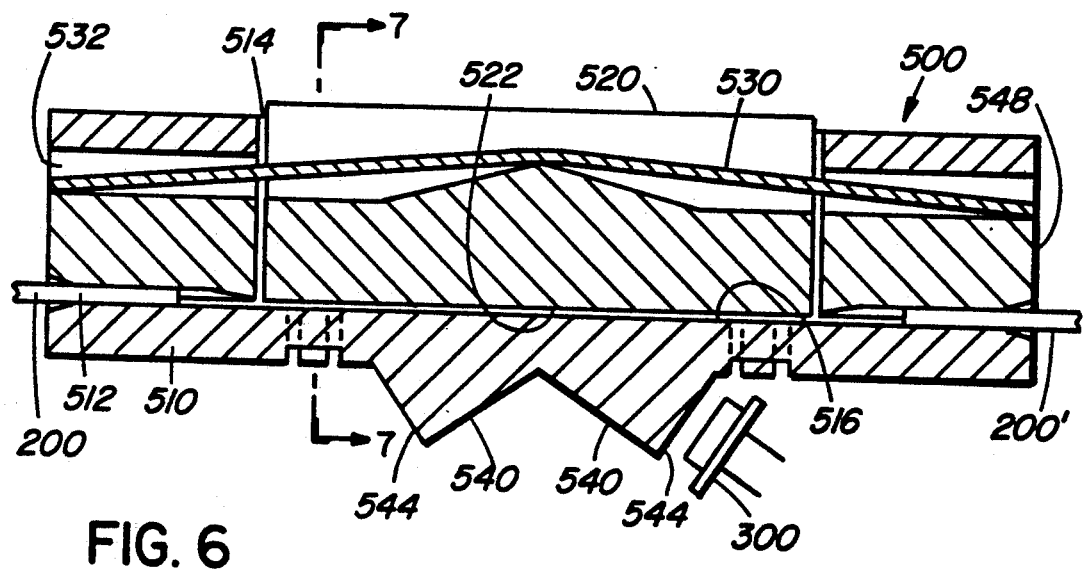
FIG. 6 is a cross-sectional view of the mechanical splice of FIG. 4 taken on section line 6—6 of FIG. 5.
Figure 7:
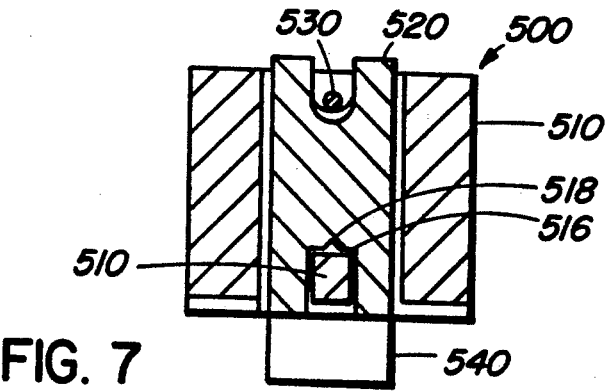
FIG. 7 is a cross-sectional view of the mechanical splice of FIG. 4 taken on section line 7—7 of FIG. 6.

FIGS. 5, 6 and 7 show yet another embodiment in the form of a mechanical splice 500. The mechanical splice 500 is generally of a design described in U.S. Pat. Nos. 5,029,972 and 5,133,033 issued Jul. 9, 1991 and Jul. 21, 1992 respectively in the names of H. Lukas et al, and entitled "Optical Fiber Mechanical Splice and Method for Its Use", which are hereby incorporated by reference.

A first body part 510 of the mechanical splice 500 has a fiber receiving passage 512 extending axially therethrough and a cavity 514 extending laterally to the fiber receiving passage 512 and terminating in a first gripping surface 516 having a v-groove 518 aligned with the fiber receiving passage 512. A second body part 520 slides into the cavity 514 of the first body part 510 to bring a second gripping surface 522 opposite the first gripping surface 516. A wire spring 530 fits into a spring receiving passage 532 of the first body part 510 and resiliently urges the body parts 510, 520 together.

To use the mechanical splice 500, the body parts 510, 520 are held apart against the urging of the spring 530 using a special jig described in U.S. Pat. Nos. 5,029,972 and 5,133,033. Ends 220, 220' of optical fibers 200, 200' to be spliced are stripped of protective coating and inserted in opposite ends of the fiber receiving passage 512 of the first body part 510. The optical fiber ends 220, 220' meet between the gripping surfaces 516, 522 of the first and second body parts 510, 520 and are aligned in the v-groove 518. The mechanical splice 500 is removed from the jig so that the spring 530 is permitted to urge the gripping surfaces 516, 522 together to retain the fibers 200, 200' in alignment.

Unlike the mechanical splices disclosed in U.S. Pat. Nos. 5,029,972 and 5,133,033, the first body part 510 of the mechanical splice 500 is constructed from a transparent polycarbonate plastic which has a refractive index which is approximately equal to or greater than a refractive index of cladding layers of the optical fibers 200, 200' to be spliced and has a pair of coupling formations 540 on a lower surface 542 opposite the gripping surface 516 as o shown in FIG. 6. The coupling formations 540 have facets 544 which are oriented normal to directions which define 25 degree angles relative to an axial direction defined by the fiber receiving passage 512. The mechanical splice 500 also has an index matching fluid in the v-groove 518 which is index matched to the cladding of the optical fibers 200, 200' to be spliced. Because the index matching fluid and the first body part 510 are index matched to the cladding of the optical fibers, some of the scattered optical power is coupled into the first body part 510 and propagates to the coupling formations 540. An optical detector 300 can be located adjacent to one of the facets 544 to measure a proportion of the scattered optical power to obtain a measure of optical power lost at the splice.

A reasonable proportion of the light scattered at the splice may be conducted by total internal reflection within the body parts 510, 520 to an end face 548 of the first body part 510. Consequently, the end face 548 may act as a coupling formation, and location of a detector adjacent to the end face 548 may permit a reasonably accurate calculation of the splice loss.

The mechanical splice 500 can be used in the accurate estimation of very small splice losses in the same manner as the protective packages 100, 100', 100' described above.

Numerous modifications can be made to the embodiments described above without departing from the principles of the invention. For example, body parts 110, 120 of the protective package 100 and body part 510 of the mechanical splice 500 are made of a transparent polycarbonate plastic for good optical coupling to cladding layers of optical fibers to be spliced, but many other materials may be suitable for these body parts provided that they have appropriate mechanical properties, are at least partially transparent and have a refractive index which is reasonably matched to the refractive index of the cladding layers, generally greater than about 1.45.

In the protective package 100 and the mechanical splice 500, multiple coupling formations 140, 540 are arranged symmetrically about fiber receiving passages 112, 114, 122, 124, 152 so that at least one of the coupling formations 140, 540 is in an appropriate position to receive optical power scattered by the splice 250 no matter which end of the package 100 or mechanical splice receives the upstream fiber 200. A single coupling formation 140, 540 would be adequate provided that more care is taken to insert the upstream fiber 200 in the appropriate end of the package 100 or mechanical splice 500.

In the mechanical splice 500, other alignment arrangements and retaining arrangements could be used. Moreover, other coupling arrangements could also be used, including the coupling arrangements 140', 140" of the alternative splice packages 100', 100".

These and other modifications are within the scope of the invention as defined below.

We claim:

1. A method for determining optical fiber joint loss, the method comprising:

launching an optical signal in an upstream fiber and measuring the launched signal at an end of the upstream fiber which is to be joined to a downstream fiber;

joining the upstream fiber to the downstream fiber and disposing the joint in a transparent medium, the transparent medium having a refractive index substantially equal to or greater than a refractive index of a cladding of the downstream fiber;

measuring a fixed proportion of optical power coupled at a predetermined angle with respect to a longitudinal axis of the downstream fiber immediately adjacent the joint; and estimating the optical fiber joint loss as $L = 1 - k(P_o/P_i)$, where L is the estimated joint loss, $P_o$ is the optical power measured before making the joint, $P°$ is the optical power measured after making the joint, and k is an empirically determined proportionality constant.

2. A method as defined in claim 1, wherein the optical signal is launched in the upstream fiber using a bent fiber coupler.

3. A method as defined in claim 1, wherein the launched optical signal has a wavelength substantially equal to 1550 nm.

4. A method as defined in claim 1, wherein the joint is disposed in the transparent medium by enclosing the joint in a joint element, the element being at least partially transparent and having at least one coupling formation for coupling out of the element light propagating in the element at the predetermined angle.

5. A method as defined in claim 4, wherein the element contains a refractive index matching material for coupling light from the cladding of the downstream fiber to the element.

6. A method as defined in claim 1, wherein the upstream fiber is joined to the downstream fiber and the joint is disposed in the transparent medium by inserting the upstream and downstream fibers in a joint element having an alignment formation for aligning the upstream and downstream fibers and a retaining arrangement for retaining the fibers in alignment, the element being at least partially transparent and having at least one coupling formation for coupling out of the element light propagating in the element at the predetermined angle.

7. A method as defined in claim 6, wherein the element contains a refractive index matching material for coupling light from the cladding of the downstream fiber to the element.

8. A method as defined in claim 1, wherein:
the transparent medium has a refractive index exceeding 1.45; and
the predetermined angle is approximately 25 degrees.

9. A method as defined in claim 1, further comprising determining the constant k by:
launching an optical signal at one end of a length of optical fiber and measuring a resulting optical signal $P_1$ at another end of the optical fiber;
breaking the optical fiber to provide upstream and downstream lengths of optical fiber;
measuring a resulting optical signal P; at another end of the upstream fiber;
rejoining the lengths of optical fiber;
measuring a resulting signal $P_3$ at an unjoined end of the downstream fiber, and calculating the joint loss $L = P_3/P_1$;
disposing the joint in a transparent medium, the transparent medium having a refractive index substantially equal to or greater than a refractive index of a cladding of the fiber;
measuring the fixed proportion $P_4$ of optical power coupled at the predetermined angle with respect to the longitudinal axis of the fiber immediately adjacent the joint; and calculating $k = (1-L)(P_2/P_4)$.

10. A joint element for enclosing aligned optical fibers, the element comprising a body having a passage therethrough for receiving the aligned optical fibers, the body being at least partially transparent, having a refractive index greater than 1.45 and having a coupling formation for coupling out of the body light propagating in the body at a particular angle relative to the passage.

11. A joint element as defined in claim 10, wherein the predetermined angle is substantially equal to 25 degrees.

12. A joint element as defined in claim 10, further comprising index matching material in the passage for optically coupling the body to cladding of optical fibers inserted into the passage.

13. A joint element as defined in claim 10, wherein the body has multiple coupling formations arranged symmetrically about the passage.

14. A joint element as defined in claim 10, wherein the coupling formation comprises at least one end face of the body which is oriented normal to a line extending at the predetermined angle.

15. A joint element as defined in claim 10, wherein the coupling formation comprises at least one facet on a lateral face of the body, the facet being oriented normal ID to the predetermined angle.

16. A joint element as defined in claim 10, wherein the coupling formation comprises at least one diffraction grating on a lateral face of the body.

17. A joint element as defined in claim 10, wherein the body comprises:
a first body part having a surface formation defining a v-groove;
a second body part movable with respect to the first body part, a surface of the second body part together with the v-groove of the first body part defining the passage; and
urging means for urging the second body part toward the first body part to align and retain optical fiber ends in the v-groove.

* * * * *